Patented May 13, 1941

2,242,087

UNITED STATES PATENT OFFICE 2,242,087

PAPERMAKING PULP MIXTURE AND METHOD OF PRODUCING THE SAME

Joseph E. Plumstead, Wilmington, Del., assignor, by mesne assignments, to West Virginia Pulp & Paper Company, New York, N. Y., a corporation of Delaware No Drawing. Application July 11, 1933, Serial No. 679,993

8 Claims. (Cl. 92—21)

This invention relates to a loading material, filler, or pigment, and to the manufacture thereof, and more particularly to methods of treating finely divided solid materials to improve their characteristics as fillers, pigments, or loading materials for use in the manufacture of paper and other materials.

An object of the present invention is to provide pigment or filler material having characteristics which render it particularly desirable for use in paper manufacture. Another object is to provide a method of treating pigment or filler material by which its opacity is improved and by which a readily sizable product is obtained. A further object is to provide highly opaque papers by including with papermaking ingredients the filler material of the present invention.

By the process of the present invention, a material which is ordinarily employed as a pigment or filler, or in the manufacture thereof, may be converted into a highly improved product by treating a suspension of particles of the material in a fluid with a reagent which will effect selective removal of portions of the particles whereby the particles are rendered spongy, vesicular and amorphous in character and whereby the regularity and angularity of shape of the particles are destroyed. This causes the particles to have a greater liquid absorptivity and what is more important a greater hiding power, greater opacity, increased softness and smoother surface characteristics when used as fillers, or pigments, particularly in high finished papers.

The percentage of retention of such treated particles in a papermaking process is increased due to the increased clinging characteristics of the honeycomb surface structure. A pigment substance, and a chemical reagent which affects the surface of pigment particles by removing matter from their surfaces and in certain instances by adding matter to their surfaces as, for example, by precipitation of substances thereon, are employed in the present process. The qualities of the final product are greatly influenced by the physical shape and chemical reactivity of the initial pigment material.

For example, a suspension of calcium-magnesium hydroxides prepared by slaking burned dolomitic lime will include finely comminuted particles in which the magnesium portion is more readily dissolved by common acidic materials than the calcium portion. The result of this method in comparison to treating a finely comminuted dolomitic limestone is that the resultant vesicular pigment whether it be in the form of carbonate, sulphite, sulphate, or a mixture of these, with the hydroxides of the aforementioned slaked material will be a better product when prepared from the latter material than when prepared from the ground limestone. The product prepared from ground limestone may, however, be made very nearly equal in quality to that prepared from slaked lime if the product obtained after treatment with the reagent is finally wet ground for instance.

The present invention includes the treatment with acidic material of alkaline earth carbonate, hydroxide, sulphate or sulphite particles in suspension to form wholly or partly soluble acid salts. After the formation of such salts there may be a treatment of the acid salt solution either after separation of the solution from the suspended unreacted portions of the particles or while the latter particles are still mixed with the solution, in order to wholly or partially neutralize the acid salt solution and so that the whole or part of the base portion of the acid salt will be precipitated as additional pigment material.

The above process may be varied to form at least three types of pigments. One is the pigment residue obtained by the treatment with reagents; an amorphous type having a honeycomb structure and being vesicular. This may or may not be ground and may or may not be dried. Another type includes a combination of the pigment residue of honeycomb structure with a precipitated pigment which may be wholly amorphous or amorphous and crystalline. Still another type includes a precipitated pigment which may be wholly crystalline or wholly amorphous, or a combination of the two.

In the manufacture of cooking acid for use in digesting pulp in the so-called sulphite process, a sulphurous acid solution of calcium bisulphite or calcium and magnesium bisulphites has been used for many years. I have found it to be particularly advantageous from an economic standpoint to produce my pigment product by the process of the present invention while preparing the cooking acid. Accordingly, the cooking acid is prepared from finely divided calcium limestone, or dolomitic limestone, or slaked lime from either of these limestones and sulphur dioxide in the presence of water by carrying out the usual acid making operation to partial completion only. In this instance, suspended particles of the lime and/or magnesium material are removed from the acid either by filtering, decanting, or otherwise, before being completely reacted upon. The resultant solution or filtrate is employed in the usual sulphite pulp digesting process, and the filter cake may be washed or treated with milk of lime and employed as a paper filler or pigment.

A method of preparing my product may be outlined in a general way as follows:

(1) Burn dolomitic limestone.
(2) Slake dolomitic lime.
(3) Treat with sulphurous acid to dissolve part of suspension.
(4) Filter or separate solids from liquids and wash to dissolve out soluble substances or instead of the filtering operation treat with an alkaline earth hydroxide to precipitate dissolved substances.

Another method is one which may be used with calcium lime by including steps one and two as above and proceeding as follows:

(3) Treat the hydroxide with sufficient acidic material to convert the hydroxide into the salt of the acid.
(4) Add enough more of the acid to partially dissolve the salt and form the amorphous compound in aqueous suspension.
(5) Add a basic metallic or alkaline salt such as carbonate or hydroxide to react with the dissolved acid salt formed in 4 so that the normal salt will be thrown down as additional pigment material.

In carrying out the process with finely ground limestone material the steps are as follows:

(1) Grind the limestone material as finely as may be desired.
(2) Treat the ground limestone material with an acidic selective solvent such as carbonic acid solution, sulphurous acid, sulphurous acid solution of bisulphite or sulphuric acid to partial, selective dissolving or a corroded state.
(3) Treat the resultant material of step 2 with a basic metallic or alkaline salt such as carbonate or hydroxide or filter off dissolved salt for recovery or wasting.
(4) Grind and dry or dry and grind as may be desired.

Carbonate particles treated in accordance with the present process have substantially the same or a greater degree of opacity when compared with particles of domestic clays or china clays or kaolins of similar color and of approximately the same size. The treated carbonate particles have no definite crystalline formation, but on the contrary are sponge-like, pitted bodies having corroded edges which are visible when examined under a high-powered microscope. The elimination of sharp edges from crystalline particles renders them more suitable for papermaking.

The spongy character of my product is indicated by its high water holding power even when subjected to reduced pressures below atmospheric. Ordinary precipitated or crystalline calcium carbonate when matted to a one-half inch cake on the plate of a vacuum press and subjected to 18 inches of vacuum for a period of three minutes will test less than 40% moisture. Calcium carbonate particles treated by my process will test over 40% of moisture when subjected to the same conditions.

In the manufacture of sodium hydroxide and precipitated calcium carbonate from sodium carbonate and calcium hydroxide according to the reaction, $$Na_2CO_3 + Ca(OH)_2 \rightleftharpoons CaCO_3 + 2NaOH$$

certain amounts of calcium hydroxide, caustic soda and sodium carbonate are left mixed with the predominating calcium carbonate. It is well known that the above reaction is reversible according to the concentrations used and that the formation of calcium carbonate from this reaction is never complete. Therefore, the calcium carbonate residue, even though thoroughly washed, is alkaline and contains varying quantities of calcium hydroxide which is preferably neutralized to render the residue satisfactory for commercial use as calcium carbonate, or precipitated chalk. I have discovered that if this surplus of alkalinity of calcium hydroxide in the calcium carbonate is neutralized with calcium bi-sulphite, preferably by the use of the reaction shown in my application Ser. No. 561,241, namely, $$Ca(HSO_3)_2 + Ca(OH)_2 \rightarrow 2CaSO_3 + 2H_2O$$

a superior precipitated product is obtained.

By washing the precipitate with water, soluble matter is substantially completely removed. The sodium sulphite that may be present in the precipitate as the result of the above process may, if not washed out, be oxidized to sodium sulphate by the use of a small amount of oxidizing material such as a solution of calcium hypochlorite as set forth in application Serial No. 561,241.

The superiority of the product obtained in the above process is due to unusual light refractions resulting particularly from a mixture of calcium carbonate, crystalline calcium sulphite $$(CaSO_3 2H_2O)$$

and amorphous calcium sulphite.

One of the major items of expense in preparing precipitated calcium carbonate for satisfactory commercial use has for many years presented itself in the necessary neutralization of the stronger alkaline associated substances. By the use of the reactions shown in my application Serial No. 561,241 I have found a method of neutralization that is inexpensive partly because sulphurous acid is readily produced from sulphur and partly because a solution of calcium bi-sulphite will produce an extraordinary yield of over 120 pounds of additional weight of filler for every 32 pounds of sulphur used. The reprecipitation of the calcium sulphite from calcium bi-sulphite solution is readily effected by the use of calcium hydroxide so that it may be seen that calcium carbonate, calcium hydroxide and calcium bi-sulphite solutions may be mixed in proportions such that the resultant substance will be a mixture of calcium carbonate and calcium sulphite in any desired or predetermined ratio. The reaction at room temperature between a solution of calcium bi-sulphite and calcium hydroxide or calcium carbonate produces a calcium sulphite which is mainly noncrystalline. Microscopic examination indicates a mere trace of the needle-like crystalline structure surrounded by an amorphous or non-crystalline calcium sulphite. This characteristic structure lends itself when used as a paper filler to a high percentage of retention of the filler in the paper sheet and a high degree of opacity. I am able to control the ratio of crystalline calcium sulphite to amorphous calcium sulphite by controlling the reaction temperatures and also by controlling the amount of sulphite radical associated with the calcium bi-sulphite. If boiling temperatures are used, the product will be largely of crystalline structure. At temperatures around 20° C. the product will be mainly noncrystalline and without water of crystallization. The product may be identified by chemical analysis and microscopic examination.

By way of definition, it is noted that calcium sulphite in its crystalline state includes two molecules of water of crystallization and in its amorphous state no water is chemically combined therewith.

The crystalline product is obtained from complete solution rather than from equilibrium in decomposition. Crystalline calcium sulphite may be made by a method described in my application Serial No. 561,241, namely, by boiling or driving off the sulphur dioxide by reduced pressure from calcium bi-sulphite solution in sulphurous acid. A solution of calcium acid carbonate in carbonic acid upon boiling or driving off of carbon dioxide by reduced pressure will give crystalline calcium carbonate. The crystalline material is improved, however, from the standpoints of opacity and color, by the presence of amorphous calcium sulphite.

To obtain amorphous calcium sulphite, lime water or milk of lime is added to a solution of calcium acid sulphite in sulphurous acid, the following reaction taking place:

$$Ca(HSO_3)_2 + (X)H_2SO_3 + (X+1)Ca(OH)_2 \rightarrow$$
$$(X+2)CaSO_3(amorphous) + (X+3)H_2O$$

To obtain amorphous calcium carbonate, lime water or milk of lime is added to a solution of calcium bicarbonate in carbonic acid to obtain the following reaction:

$$Ca(HCO_3)_2 + (X)H_2CO_3 + (X+1)Ca(OH)_2 \rightarrow$$
$$(X+2)CaCO_3(amorphous) + (X+3)H_2O$$

Another method of forming amorphous carbonate is by treating calcium carbonate with carbonic acid as follows:

$$(X)CaCO_3 + (Y)H_2CO_3 \rightarrow (X-Y)CaCO_3$$
$$(amorphous) + (Y)Ca(HCO_3)_2$$

In the above equations, magnesium may be substituted for part of the calcium.

Amorphous, vesicular calcium sulphite is the result of treating calcium sulphite with sulphurous acid, in the following reaction:

$$(X)CaSO_3 + (Y)H_2SO_3 \rightarrow (X-Y)CaSO_3$$
$$(amorphous, vesicular) + (Y)Ca(HSO_3)_2$$

Excellent results as a paper filler, for instance, may be obtained by mixing my product with other paper making fillers such as calcium sulphate, crystalline or amorphous, or clay. These may both be added, if desired. A substance such as clay, or a substance having no regular crystalline shape may be mixed with my product particularly if it contains crystalline bodies to further improve their opacity or covering power.

In producing amorphous calcium sulphite or crystalline calcium sulphite or a mixture of the two, either chemically precipitated carbonate or mechanically pulverized carbonate may be used or sulphurous acid may be allowed to react on limestone. Chemically precipitated carbonate will give a superior product.

In the production of paper, the various forms of my calcium sulphite product may be included with any of the fillers referred to, or a combination of such or similar fillers, and with size and fibrous matter to form a paper pulp product. Other papermaking ingredients, if desired, may also be included as, for instance, aluminum sulphate. Starch, casein, glue or soluble cellulose compounds may be used with my filler combination, to increase retention, to give greater strength to the sheet of paper, to impart a smoother sheet surface and to obtain freedom from dust.

It has always been very difficult to use a soap sizing such as rosin soap when using a filler of lime origin such as calcium carbonate filler. I have found that lime fillers made up according to the following combinations, particularly the sulphite fillers, may be sized very readily with soap size without undue foaming. One method of doing this is to add size and the carbonate filler produced in the reaction between sodium carbonate and calcium hydroxide to the beater and afterwards add a calcium bi-sulphite solution in a quantity chemically sufficient to neutralize the alkalinity of the filler and soap size and an additional amount of calcium bi-sulphite to provide as much calcium sulphite as may be desired.

The following are examples of compositions prepared in accordance with the present invention:

*Example I*

|  | Per cent |
|---|---|
| 300 mesh ground lime stone | 85 |
| Amorphous calcium sulphite | 8 |
| Crystalline calcium sulphite | 2 |
| Clay | 5 |

*Example II*

|  | Per cent |
|---|---|
| Crystalline calcium sulphite | 5 |
| Amorphous calcium sulphite | 10 |
| English china clay | 10 |
| Rosin soap | 2 |
| Aluminum sulphate | 2 |
| Paper pulp | 71 |

The above mixture totalling 100% made up 6% of a mixture containing 94% water, this mixture being used in the manufacture of paper.

*Example III*

|  | Per cent |
|---|---|
| Calcium sulphite amorphous | 20 |
| Calcium sulphite crystalline | 5 |
| Calcium sulphate | 2 |
| Rosin soap | 2 |
| Calcium bi-sulphite | 2 |
| Paper pulp | 69 |

The above mixture totalling 100% made up 6% of a mixture containing 94% water for making paper.

*Example IV*

|  | Per cent |
|---|---|
| Calcium sulphite amorphous | 25 |
| Rosin soap | 2 |
| Aluminum sulphate | 2 |
| Paper pulp | 71 |

The above mixture totalling 100% made up 6% of a mixture containing 94% water.

*Example V*

|  | Per cent |
|---|---|
| Calcium carbonate | 15 |
| Calcium sulphite amorphous | 10 |
| Calcium sulphite crystalline | 5 |
| Rosin soap | 1 |
| Calcium bi-sulphite | 3 |
| Soluble starch | 3 |
| Paper pulp | 63 |

The above mixture totalling 100% made up 6% of a mixture containing 94% water.

More permanently white and more permanently light fast papers may be made from my material when using ground wood or mechanical pulp than has heretofore been possible. As explained in my prior application Ser. No. 561,241, the presence of calcium sulfite tends to prevent the yellowing of papers produced from mechanical wood pulp due to age and exposure to air and sunlight.

For example the following formula has been found to be more light fast and more opaque than a paper made from similar fibres which does not contain my filler.

*Example VI*

| | Per cent |
|---|---|
| Calcium carbonate | 15 |
| Calcium sulphite amorphous | 10 |
| Calcium sulphite crystalline | 5 |
| Rosin soap | 1 |
| Calcium bi-sulphite | 3 |
| Soluble starch | 3 |
| Mechanical or ground wood pulp | 43 |
| Chemical pulp | 20 |

By varying the proportions of ground wood pulp, chemical pulp and calcium sulphite and also by omitting the rosin soap or omitting calcium bi-sulphite or by omitting the soluble starch in the product in Example VI, the grades of paper obtained may be varied.

While calcium carbonate is used above in the preparation of the product of the present invention, it has been found that dolomite, a natural carbonate of calcium and magnesium in varying proportions, or other magnesium lime stones including magnesite are also suitable for such use. The product resulting from the reaction of dolomite with calcium bisulphite solution, for instance, contains a mixture of calcium and magnesium sulphites which mixture, may be employed in pigments, fillers and loading materials of the type described. Magnesium sulphite alone may also be produced, for use in the product described, from magnesium carbonate or hydrate. The carbonates may be reacted upon by the bisulphite solution to convert a given batch completely to sulphites, or a given batch of carbonates may be partially converted to form a mixture of carbonate and sulphite material.

Depending upon the amount of calcium bisulphite or sulphurous acid added to an alkaline carbonate material the resulting filler product may effect a neutral or slightly acid reaction when suspended in water or it may effect a slightly alkaline reaction if desired. Where reference is made in the appended claims to "sulfite ions," this is to be understood as including not only the normal sulfite ions but also the acid sulfite or bisulfite ions which are present in the specified acidic agents.

In the treatment of carbonate or other suspensions with carbonic acid, by one method carbon dioxide gas is bubbled through the suspension in an aqueous medium. The carbon dioxide may be introduced in pure form or in the form of waste gases such as combustion gases or lime kiln gases. The bubbles are preferably finely divided and uniformly distributed.

Another method is to form a cake of the carbonate, or other material to be treated, on a screen by differential pressure as in a plate or leaf type filter press and pass a solution of carbonic acid through the cake.

When using a dolomitic lime as the original raw material there may be developed during the reaction with carbon dioxide a basic magnesium carbonate which will give undesirable results when used as a paper filler. All limes contain certain amounts of magnesium. I have found it desirable to make certain that no basic magnesium carbonate be present. I can overcome this by treatment with acids, using carbonic, sulphurous or sulphuric acids for the treatment.

This basic carbonate may also be present with carbonic acid. In such case, the addition of a hydroxide such as calcium hydroxide will assist in forming the normal carbonate and will tend to prevent foaming in the papermaking process.

I have also found it desirable from the standpoint of opacity or hiding power not to overcome the basic carbonate by recrystallization of the magnesium salts present. These salts, particularly the basic carbonate, should be changed either to the normal carbonate or to soluble salts and washed out as the perfect crystals of magnesium salts make the filler more transparent or cause less opacity.

Mixtures of calcium and magnesium carbonate obtained by slaking a burned dolomitic limestone and treating the slaked material with carbon dioxide, when treated with aluminum sulphate, sulphurous acid, calcium or magnesium bisulphites, are converted into finely divided products particularly adapted for producing printing papers of high quality and of unusual opacity and obscuring power. In certain instances it is not necessary to completely neutralize the alkalinity of the mixture of carbonates, a desirable product being prepared by partial neutralization of alkaline matter or by making the product slightly acid. The product obtained, when, for instance, sulphurous acid or bisulphites, the preferred acid materials, are used for changing the alkalinity, comprises calcium and magnesium sulphites, and calcium and magnesium carbonates in which the magnesium compounds may be present in substantially smaller amount than is chemically equivalent to the calcium compounds present.

A colored or tinted paper may be prepared by mixing products of the present invention with dispersed or soluble starch, casein, or glues, and a dye before adding them to other ordinary papermaking materials. The mixing may be done in a common beater or mixer.

Pigments or fillers may be treated to improve their color as well as their opacity and sizability by the following treatments:

The solid particles are maintained in a dispersed condition in water. Any of various gelatinous substances or mordants including starch, glue, casein, aluminum hydroxide, silica gel, magnesium phosphate, or tungstic materials, or other substances which form lakes with coloring matter, are distributed on the suspended particles. Mordants may be employed to the extent of under 10% of the weight of the filler. Colorings are then added such as Prussian blue, indanthrene, methylene blue, or other paper maker's dyes. Mostly pinkish or bluish colors are imparted to the filler. This treatment can be carried out in a beater either before or after the filler is mixed with paper stock.

The following formula has proven satisfactory:

|                              | Approximate percentage |
|------------------------------|------------------------|
| Bleached sulphite pulp       | 35                     |
| Bleached soda                | 30                     |
| Calcium carbonate            | 26                     |
| Magnesium carbonate          | 4                      |
| Alkali earth sulphites       | 1                      |
| Starch                       | 4                      |
| Tungstic colors              | .06                    |

Another treatment is to suspend the filler particles in water as set forth above either in a mixing tank provided with stirrers, or in a beater. Then a reducing agent is introduced whereby the suspended particles are whitened. For instance, hydrogen sulphide gas may be bubbled through the mixture until the particles are whitened, or are somewhat paler than the original particles. Or about 1% or more of zinc sulphite may be mixed with the suspension to obtain the whitening effect.

The above treatments as well as the aforegoing treatments with acid materials to improve opacity, may be used singly or combined with each other and may be carried on in the beater or a tank provided with a stirring device. For instance, an acid treatment, or a carbon dioxide treatment, or a reduction treatment may be followed by a starch and color treatment, or a reduction treatment may be followed by a treatment with an acidic reagent.

When gases are employed, it is preferable to treat the pigment or filler before papermaking ingredients are added. The other treatments may be applied before, during, or after the beater stage or before, during or after the addition of paper making ingredients to the pigment or filler.

In the treatment of filler material with acidic substances to improve the opacity and sizability thereof by corroding the surfaces of the filler particles, the acidic substances are added to suspensions of the particles in such proportions as are insufficient to completely convert the substance of the filler into the salt of the acid used. When contacting the suspension of filler particles in an aqueous medium with carbon dioxide or with sulphur dioxide, these gases are bubbled through the suspension until the particles become more opaque than the original particles, after which the passage of gases may be discontinued or the filler may be separated from the suspending medium. In the use of solutions of acidic substances as reagents these may be added to the suspensions in predetermined proportions. In the acid treatments, the proportions determine the degree of corrosion of the surfaces of the filler particles and are limited only to the extent that the acid is sufficient to effect a surface change rather than a complete chemical conversion.

Dolomites may be employed in papermaking in finely divided condition combined with mechanical or other wood pulps and other papermaking ingredients, but it is preferable to treat the dolomites to improve them as herein set forth.

In the various formulas given the proportions are expressed in terms of weight.

Although the product of the present invention finds its use particularly in papermaking, it is to be understood that it may also be employed in paints, textiles, plastics, resinous materials such as rubber, and the like.

Certain of the subject matter disclosed herein relating to a process of preparing a pigment product or the like is disclosed and claimed in a division hereof now issued as Patent No. 2,186,040 granted January 9, 1940.

I claim:

1. A process comprising mixing calcium carbonate with which is associated calcium hydroxide, with a soap size and paper pulp, treating the resulting mixture with calcium bi-sulphite solution to react with the alkaline carbonate filler and soap size and adding an excess of calcium bi-sulphite to produce in the pulp mixture calcium sulphite as a filler.

2. A composition comprising calcium carbonate, calcium sulphite amorphous, calcium sulphite crystalline, rosin soap, calcium bi-sulphite, soluble starch, mechanical wood pulp, and chemical pulp.

3. A process for producing a papermaking pulp mixture which comprises intermixing pulp fibers and a filler containing calcium carbonate and calcium hydroxide and adding to said mixture and intermingling therewith at least sufficient calcium bisulfite to neutralize the hydroxide, thereby producing calcium sulfite as an additional filler.

4. A process for producing a papermaking pulp mixture which comprises intermixing pulp fibers composed at least in part of mechanical wood pulp and a filler containing calcium carbonate and calcium hydroxide, and reacting with the filler in said mixture a quantity of an acidic agent the negative ions of which consist essentially of sulfite ions at least sufficient to neutralize the hydroxide ions, thereby producing calcium sulfite acting as an agent to prevent the yellowing of paper produced from the pulp mixture.

5. A process for producing a papermaking pulp mixture which comprises intimately intermingling pulp fibers, a filler containing calcium carbonate and calcium hydroxide, and a quantity of an acidic agent the negative ions of which consist essentially of sulfite ions at least sufficient to neutralize said calcium hydroxide, thereby producing calcium sulfite as an additional filler.

6. A pulp mixture which comprises bleached chemical pulp fibers, calcium carbonate and calcium sulfite, the calcium carbonate and calcium sulfite together forming not less than about 30% of the mixture, the calcium sulfite forming more than 1% of the mixture, and the calcium carbonate forming not less than about 15% of the mixture.

7. A pulp mixture which comprises pulp fibers, calcium carbonate and calcium sulfite, the calcium carbonate and calcium sulfite together forming not less than about 30% of the mixture, the calcium sulfite and the calcium carbonate each forming not less than about 15% of the mixture.

8. A pulp mixture comprising pulp fibers and a filler comprising a mixture of calcium carbonate and calcium and magnesium sulfites, said sulfites being formed by the reaction of dolomitic material with an acidic agent containing a sulfite radical, the filler comprising not less than about 30% of the mixture, the sulfites and the carbonate each forming not less than about 15% of the mixture.

JOSEPH E. PLUMSTEAD.